(12) United States Patent
Acree

(10) Patent No.: US 12,428,863 B1
(45) Date of Patent: Sep. 30, 2025

(54) PORTABLE SWIMMING POOL SKIMMER

(71) Applicant: Vince Acree, South Chesterfield, VA (US)

(72) Inventor: Vince Acree, South Chesterfield, VA (US)

( * ) Notice: Subject to any disclaimer, the term of this patent is extended or adjusted under 35 U.S.C. 154(b) by 0 days.

(21) Appl. No.: 19/040,780

(22) Filed: Jan. 29, 2025

Related U.S. Application Data

(63) Continuation-in-part of application No. 18/907,475, filed on Oct. 5, 2024.

(51) Int. Cl.
| | |
|---|---|
| *E04H 4/12* | (2006.01) |
| *B01D 29/11* | (2006.01) |
| *B01D 35/05* | (2006.01) |
| *C02F 1/00* | (2023.01) |
| *C02F 1/40* | (2023.01) |
| *C02F 103/42* | (2006.01) |

(52) U.S. Cl.
CPC .......... *E04H 4/1263* (2013.01); *B01D 29/11* (2013.01); *B01D 35/05* (2013.01); *C02F 1/001* (2013.01); *C02F 1/40* (2013.01); *C02F 2103/42* (2013.01)

(58) Field of Classification Search
CPC ....... E04H 4/1263; B01D 29/11; B01D 35/05; C02F 1/001; C02F 1/40; C02F 2103/42
USPC ..... 210/167.19, 167.2, 232, 238, 416.2, 121
See application file for complete search history.

(56) References Cited

U.S. PATENT DOCUMENTS

| | | | | |
|---|---|---|---|---|
| 3,169,920 | A * | 2/1965 | Payne | E04H 4/1281 |
| | | | | 210/331 |
| 5,128,031 | A * | 7/1992 | Midkiff | B01D 35/05 |
| | | | | 210/167.2 |
| 5,264,122 | A | 11/1993 | Lakotish | |
| 5,454,940 | A | 10/1995 | Lakotish | |
| 5,584,991 | A * | 12/1996 | Wittstock | C02F 3/04 |
| | | | | 119/260 |

(Continued)

FOREIGN PATENT DOCUMENTS

| | | | | |
|---|---|---|---|---|
| CN | 108791734 A | * | 11/2018 | |
| CN | 119102399 A | * | 12/2024 | ........... E04H 4/1654 |
| FR | 2001036335 | | 5/2001 | |

OTHER PUBLICATIONS

Machine-generated English translation of CN 108791734, generated on May 19, 2025.*

(Continued)

*Primary Examiner* — Fred Prince

(57) ABSTRACT

A portable surface water or liquid skimmer system, and method of operating same, operative to skim a surface of a body of water or liquid independent of any fixed filtration system or external pump are disclosed. A surface water/liquid skimmer system may comprise an inlet chamber having a surface water/liquid inlet, an outlet chamber having a return water/liquid outlet, and a divider separating the inlet chamber and the outlet chamber and having a divider aperture to communicate filtered water/liquid from the inlet chamber to the outlet chamber. A filter medium is between the surface water/liquid inlet and the divider aperture. A pump communicates filtered water/liquid from the divider aperture to the return water/liquid outlet. A float may be attached to the housing to float on the body of water/liquid such that the surface water/liquid is communicated to the surface water/liquid inlet.

14 Claims, 8 Drawing Sheets

(56) References Cited

U.S. PATENT DOCUMENTS

| | | | |
|---|---|---|---|
| 6,502,269 B1 | 1/2003 | Balchan et al. | |
| 6,706,174 B1 * | 3/2004 | Keith | B01D 29/01 |
| | | | 210/489 |
| 6,709,580 B2 * | 3/2004 | Ouwinga | A01K 63/04 |
| | | | 210/167.01 |
| 6,797,157 B2 | 9/2004 | Erlich | |
| 2002/0027097 A1 * | 3/2002 | Baer | E04H 4/1254 |
| | | | 210/167.19 |
| 2003/0201218 A1 * | 10/2003 | Henkin | E04H 4/1654 |
| | | | 210/167.2 |
| 2006/0163132 A1 * | 7/2006 | Kelty | E04H 4/1272 |
| | | | 210/776 |
| 2010/0084325 A1 * | 4/2010 | Parks | E04H 4/1272 |
| | | | 210/167.12 |
| 2013/0146106 A1 * | 6/2013 | Erlich | E04H 4/1654 |
| | | | 134/34 |
| 2015/0247332 A1 * | 9/2015 | Norberto, III | E04H 4/1263 |
| | | | 210/167.2 |
| 2018/0283027 A1 * | 10/2018 | Huang | B01D 35/05 |
| 2022/0220761 A1 | 7/2022 | Lancry et al. | |
| 2022/0289592 A1 * | 9/2022 | Leung | C02F 1/001 |
| 2023/0107841 A1 * | 4/2023 | Duffaut | E04H 4/1263 |
| | | | 15/1.7 |

OTHER PUBLICATIONS

Machine-generated English translation of CN 119192399, generated on Jul. 29, 2025.*
https://www. skim-a-round. com/ Publication Date Unknown.
https://racktodoor.com/prodLicts/cordless-robotic-pool-cleaner-rechargeable-pool-robot-vacLILimLipto-753-sqft?variant=40674897723462&currency=USD&utm_medium=product_sync&utm_source=googlee&utm_content=sag_organic&utm_campaign=sag_organic&gad_source=1&gclid=Cj0KCQjw2PSvBhDjARIsAKc2cgMMQ17hVNeNoKyZX-PUpyWbfsMAMETErZs0yLIW71pVnAXIFoPu_ Publication Date Unknown.

* cited by examiner

PORTABLE SWIMMING POOL SKIMMER

CROSS-REFERENCE TO RELATED APPLICATIONS

This application is a continuation-in-part of co-pending U.S. patent application Ser. No. 18/907,475, filed Oct. 5, 2024, the disclosure of which is hereby incorporated herein by reference in its entirety.

TECHNICAL FIELD

The invention relates to a swimming pool skimmer and a method of cleaning and maintaining swimming pool water.

BACKGROUND

Swimming pool skimmers generally work in conjunction with a main pool pump system associated with the swimming pool. When that system is turned off for seasonal reasons (e.g., winterization) or otherwise not working or available, the pool skimmer and the cleaning it performs is not available. It may also be useful to have a swimming pool skimmer that is not dependent upon a main swimming pool pump system for other reasons (e.g., to add filtration capability, to add a main filter capability, to temporarily clean a swimming pool).

A need exists for a portable swimming pool skimmer that can clean and maintain a swimming pool that works independently of a main pool pump system.

SUMMARY

Preferred embodiments of this invention comprise a portable swimming pool skimmer that is capable of working independently from a main swimming pool pump system. These embodiments comprise several components, including a housing, and can be used in methods for cleaning and maintaining a swimming pool. Although this invention is disclosed in an exemplary context of a swimming pool, the present invention can be used in other applications and may be used for liquids other than water.

The housing may comprise an interior portion that can be separated in whole or in part by a dividing wall into a first portion and a second portion.

The first portion of the interior of the housing can contain a liquid or water inlet, which is most preferably a weir door. This water inlet can let water into the device from the swimming pool. The first portion of the interior of the housing can also contain one or more filtration components. These filtration components can comprise one or more filter baskets, with or without socks, that collect trash and debris. These filtration components can also comprise one or more screens.

The second portion of the interior of the housing can contain a pump. This pump is most preferably an electric submersible water pump (e.g., 2,000-8,000 GPH 110 volt pump). This pump is connected to a water outlet. The water outlet most preferably comprises a pipe (or hose) and a valve, as well as other possible components. The water outlet is most preferably positioned so as to create circulation of the water in the swimming pool. This can aid in the cleaning of the pool by moving water with trash and debris towards the portable swimming pool skimmer for filtering.

Attached to the outside of the housing is preferably a floatation component. This floatation component most preferably comprises one or more brackets that each attach one or more PVC floats to the housing. Also attached to the outside of the housing can be a bracket that can hold the device in place in the pool, attaching it to a part of a pool (e.g., a ladder) or something outside of the pool, to thereby hold the portable swimming pool skimmer of this invention in place.

The portable swimming pool skimmer in certain preferred embodiments operates by floating in a swimming pool using the floats attached to the housing with the brackets. Swimming pool water, which may contain trash and debris, enters the first portion of the interior of the housing through the opening, and most preferably through a weir door.

The swimming pool water then flows through the filtration components that filter out the trash and debris, passing under (or otherwise through) the housing's dividing wall and into the second portion of the interior of the housing that contains the pump. The pump collects the water and pumps it out of the water outlet (e.g., into the swimming pool). Most preferably, the water outlet is positioned to create a current or water travel in the swimming pool that circulates the water in the pool around and back towards the portable swimming pool skimmer, thereby aiding in cleaning and maintaining the swimming pool water.

The preferred embodiments of this invention largely operate automatically. A user will be required only to empty out the filter components every so often (e.g., 12 to 24 hours), depending on the amount of debris.

Preferred materials that are used for the components of the portable swimming pool skimmer (including the housing) include non-corrosive materials, such as acrylic, PVC, plastic, aluminum, and stainless steel.

Most preferred embodiments have a remote control on/off switch for the portable swimming pool skimmer that can be turned on and off from a remote location, such as inside a home.

The filter components may comprise filter baskets that may or may not contain additional filtration (e.g., filter socks) to collect fine debris (e.g., pollen) and/or larger debris (e.g., leaves, insects), depending on the needs of and desires of the user and/or from the type of debris expected at the particular location of the pool.

In some embodiments of this invention, it may be useful to add weights to the bottom of the housing to help maintain the desired buoyancy. This may be particularly useful when using filter socks, which tend to slow the rate of incoming water versus the displacement rate of the water pump.

Preferred embodiments of this invention may also include a mounting apparatus for various types of pools (e.g., inground, above ground). Particularly preferred embodiments use quick connects that attach to the handrail, side, or other part of a pool (e.g., near steps).

The embodiments of this invention operate in swimming pools that contain water and have their own separate pump system. The embodiments of this invention do not use the swimming pool's pump system to operate and thus these embodiments are self-contained and autonomous units from the swimming pool's own system.

DRAWINGS

DETAILED DESCRIPTION

Figure 1:
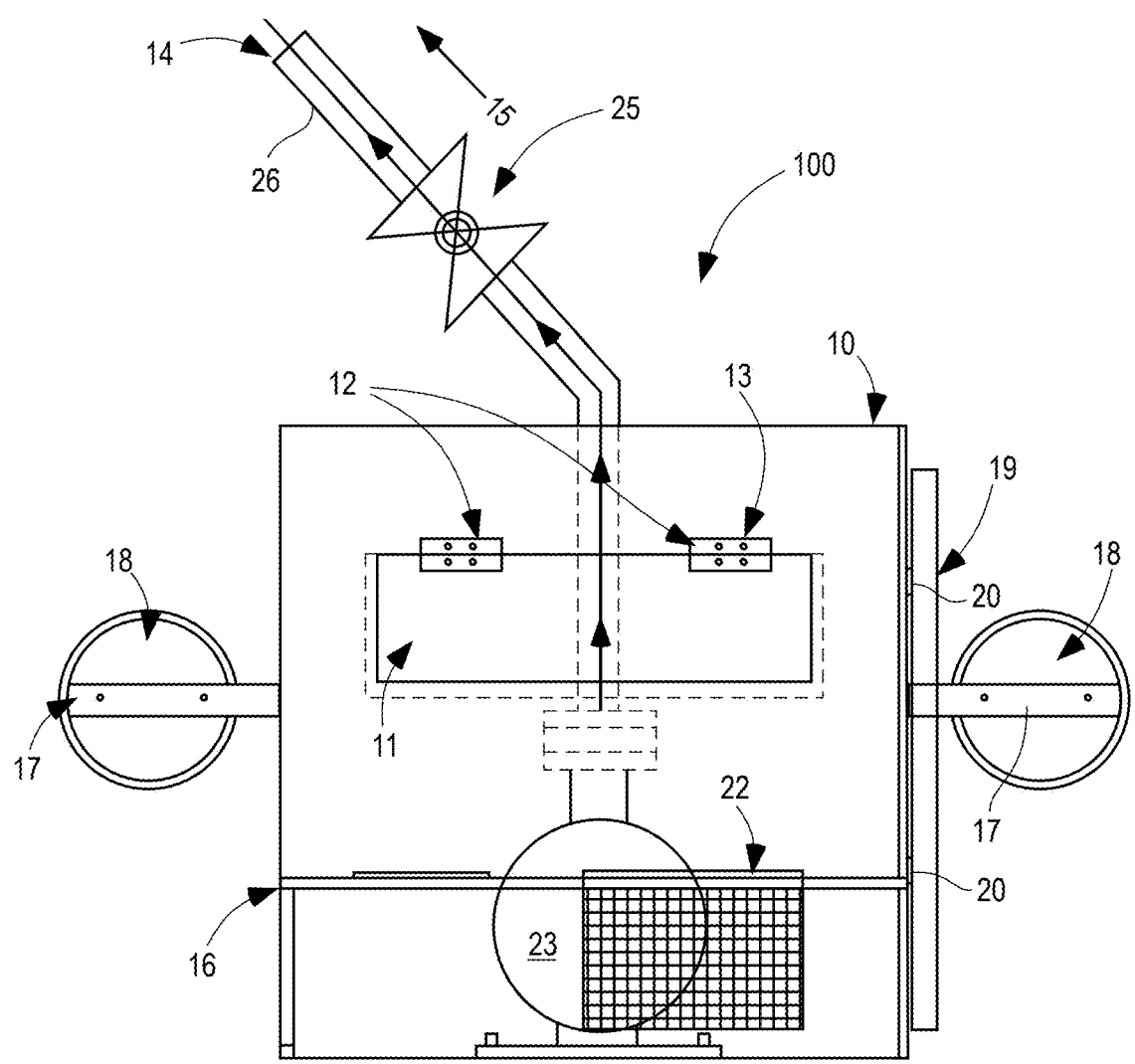
FIG. 1 is a schematic of an embodiment of this invention, showing a rear-view (in partial cross-section) of an exemplary device.

As set forth herein, a portable (e.g., carriable by one or two people, weighing less than about 40 lbs without water or liquid, self-contained in a housing, about 2 ft by about 2 ft by about 3.5 ft) skimmer may generally comprise a housing. This housing comprises an interior. The interior comprises a first interior portion and a second interior portion. The first interior portion is at least partially separated from the second interior portion by a dividing wall (e.g., the dividing wall may have an orifice or it may not go to the very bottom of the interior) and the first interior portion and the second interior portion each have a bottom area.

In these embodiments, the first interior portion comprises one or more filtration components (e.g., two filtration baskets that may or may not use socks for finer filtration of finer debris; one or more screens) and a filtration component bracket that holds each of the one or more filtration components in place. This first interior portion further comprises an outside opening (e.g., weir door or flap) that permits swimming pool water or other liquid to enter the first interior portion.

The second interior portion comprises an electric water pump that pumps water or other liquid from the bottom area of the second interior portion (which water comes from under or through an opening in the dividing wall) through a water or liquid outlet (e.g., comprising a pipe or hose and a valve) and into the swimming pool or liquid reservoir.

The portable skimmer also comprises one or more floats that are attached to the housing to float the portable skimmer in the swimming pool or liquid reservoir (e.g., preferably in a stationary position, held in place by attaching the device to a part of the pool or reservoir (e.g., a handrail on steps) or nearby surroundings).

In operation, the swimming pool water or liquid enters the outside opening of the first interior portion and into the first interior portion. Next, the swimming pool water or liquid flows through the one or more filtration components, filtering out the trash and debris, and into the bottom area of the first interior portion. After that, the swimming pool water or liquid flows under or through the dividing wall and into the second interior portion. Finally, the swimming pool water or liquid flows through the pump and out through the water outlet and into the swimming pool or reservoir.

The water or liquid outlet is placed to cause circulation of the swimming pool water in the swimming pool (or liquid in the reservoir) as the water (or liquid) is discharged from the water or liquid outlet. In addition, the portable skimmer is portable and it can be moved by one or two adults. It also does not use the main swimming pool pumping system. It is self-contained and preferably uses a 110 volt electrical cord.

Methods of cleaning and maintaining a swimming pool or liquid reservoir are provided herein. These methods comprise (a) collecting swimming pool water containing trash and debris from the swimming pool into a portable and self-contained swimming pool skimmer; (b) filtering the trash and debris from the swimming pool water using one or more filtration components contained in the portable swimming pool skimmer; (c) discharging the filtered swimming pool water from the portable swimming pool skimmer through a water outlet and back into the swimming pool using an electric water pump; and (d) circulating the water in the swimming pool by positioning the water outlet to create a water current in the swimming pool that moves water towards the portable swimming pool skimmer.

FIG. 1 shows a schematic (in partial cross-section) of a rear view of a skimmer device 100. The device 100 generally comprises a housing 10 for its components and connections. The housing 10 is preferably formed of ¼ inch acrylic sheets, stainless steel sheet (or a similar material that is capable of being wet without degrading) of various sizes, shapes and thicknesses.

Attached to the side of the device housing 10 in this embodiment is a weir door inlet 11. A weir door inlet 11 assists in skimming by inputting and/or creating a current or water flow into the skimmer device 100 from the pool water (not illustrated in FIG. 1). Weir inlet 11 allows water and debris to flow into the device 100. It also may help distribute the flow of water more evenly, reducing the risk of clogs in the strainer (e.g., filter) baskets. Such clogs may lead to poor water circulation through the device 100 and even cause damage to its pump and thus a weir door inlet 11 is a helpful component.

In some embodiments of a weir door inlet 11, as the pool water is pumped from the skimmer, the weir door self-adjusts (drops or otherwise opens), allowing an amount of pool water to flow across or under the weir and into the strainer baskets 22 (discussed below).

The weir door inlet 11 can be attached to the housing 10 by hardware. The embodiment shown in FIG. 1 uses stainless steel hinges 12 with machine bolts and nylon locknuts 13, though other hardware (e.g., a single piano-like hinge, multiple hinges, one or more rubber-like or flexible plastic flanges acting as a hinge) may be used to secure weir door inlet 11 to the housing 10 to support the functionality set forth herein.

FIG. 1 shows a pump 23 that is connected to a water outlet 14 at a terminus of an output pipe or tubing 26. The water outlet 14 provides circulation as the pump 23 collects water from the bottom of the device and pumps it out the water outlet 14 via output pipe 26, in the direction of water flow shown by the arrow indicated at reference numeral 15. The pump 23 shown in FIG. 1 is attached to the bottom of the device 100 by hardware (e.g., bolts, screws). The pump 23 draws water from the bottom of the device 100 that has passed through one or more strainer or filtration baskets 22. The strainer baskets 22 may be held in place by a basket support plate 16 (or filtration component bracket) made of a suitable material (e.g., stainless steel, acrylic), which in some embodiments is removable for easier cleaning.

In the embodiment shown in FIG. 1, there is also a bracket 17 on each side of the device 100 for attaching one or more floats 18 (e.g., PVC). These PVC floats 18 permit the housing 10 to float in the swimming pool at the appropriate height for the device 100 to perform its skimming function. In this embodiment, the bracket 17 is comprised of ⅛ inch by 1 inch stainless steel. Other materials, sizes and shapes for such a bracket 17 and a float 18 can be used. The purpose of the bracket 17 and float 18, or other components that can be substituted for them in other embodiments, is to hold the device 100 in the swimming pool at the correct height and with enough stability so that it can float in the pool and perform its skimming functions. Any components that can be substituted for this bracket 17 and float 18 combination can thus be used.

On the rear view that is shown in FIG. 1, a portion of a bracket component (reference numeral 19) can be seen for a free flotation system. The bracket 19 holds the device 100 in place and allows it to float to the correct height set by the floats 18. In this embodiment, this portion of the bracket 19 is on the right side of the figure and it is shown as a ½ inch diameter stainless steel pipe that is attached to the housing 10 via attachment rails 20. The attachment can be by stainless steel bolts, screws or other hardware and the bracket 19 can be made of other materials (e.g., plastic) than stainless steel. This arrangement is discussed in greater detail with reference to FIG. 8 below.

Figure 2:
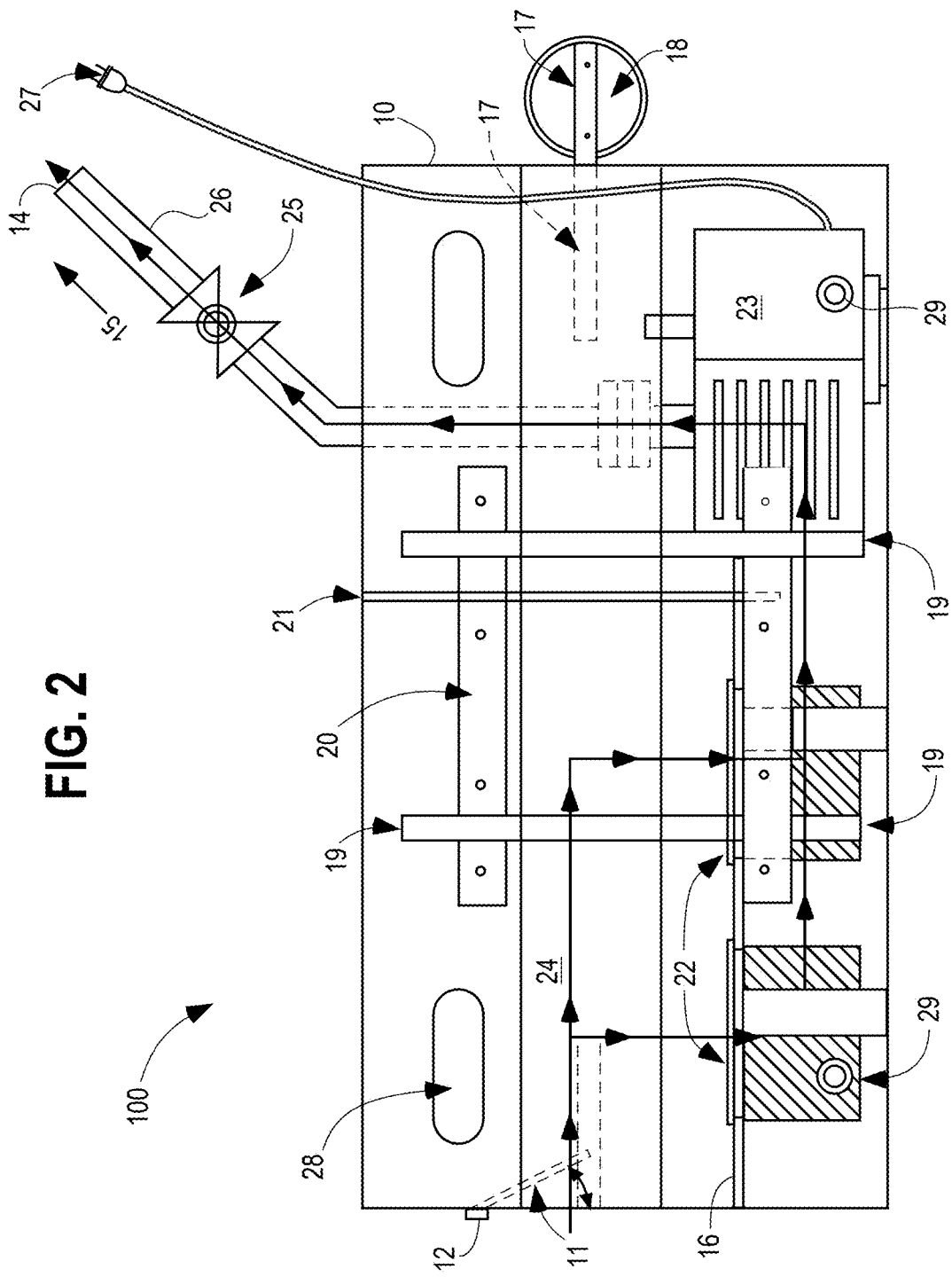
FIG. 2 is a schematic of an embodiment of this invention, showing a right-side view (in partial cross-section) of an exemplary device.

FIG. 2 shows a schematic of the right side view of the device 100 depicted in FIG. 1. In FIG. 2, the rear of the device 100 (as shown in FIG. 1) is to the left of the drawing figure.

FIG. 2 shows a bracket 19 for a free flotation system, which, in some implementations, may be comprised of two pipes (e.g., ½ inch stainless steel) and two flat attachment rails 20 (⅛ inch by 1 inch stainless steel) attached to the device housing 10. The attachment hardware can be stainless steel bolts, screws, and other hardware. The bracket itself can be made of other materials, shapes and sizes.

FIG. 2 shows that the interior of the housing has a divider wall 21 that separates a first portion of the housing interior containing one or more strainer baskets 22 and a second portion of the housing interior that contains the pump 23. The strainer baskets 22 or other filter device can be held in place by the basket support plate 16 (also shown in FIG. 1) that in some embodiments is removeable for easier cleaning.

FIG. 2 shows that water flows (generally from left to right as indicated by the arrows labeled 24 in the figure) through the weir door inlet 11, or other suitable opening, into the device 100, and into the first portion of the housing 10. The water then flows through the strainer baskets 22 to the bottom of the device 100, passes under the divider wall 21, or through some other orifice or passage in the divider wall 21, and into the second portion of the housing and then into the pump 23. The pump 23 then pumps the water to the water outlet pipe 26 (e.g., and back into the swimming pool via outlet 14).

In this embodiment, the water outlet pipe 26 comprises 1 inch PVC pipe with a 1 inch full port ball valve 25 to control the rate of water flow. This embodiment also shows that an electric pump 23 is used with a 20 foot 110 volt power cord 27. Other water outlets, pipes, valves, and pumps can be used.

FIG. 2 also shows that the housing 10 may have hand holes 28 or handles located near the top of the device 100 to aid one or more persons in lifting and carrying the device 100. FIG. 2 also shows two plugs 29 (e.g., 1 inch or another size made of plastic, metal or other material) that can help drain or fill the device with water.

FIG. 2 also shows embodiments of brackets 17 for the PVC float 18 also shown in FIG. 1. In use, a bracket 17 may be used rigidly to affix float 18 to housing 10 such that device 100 remains floating at a suitable level to admit surface water to enter housing 10 at weir door inlet 11 substantially as set forth herein.

Figure 3:
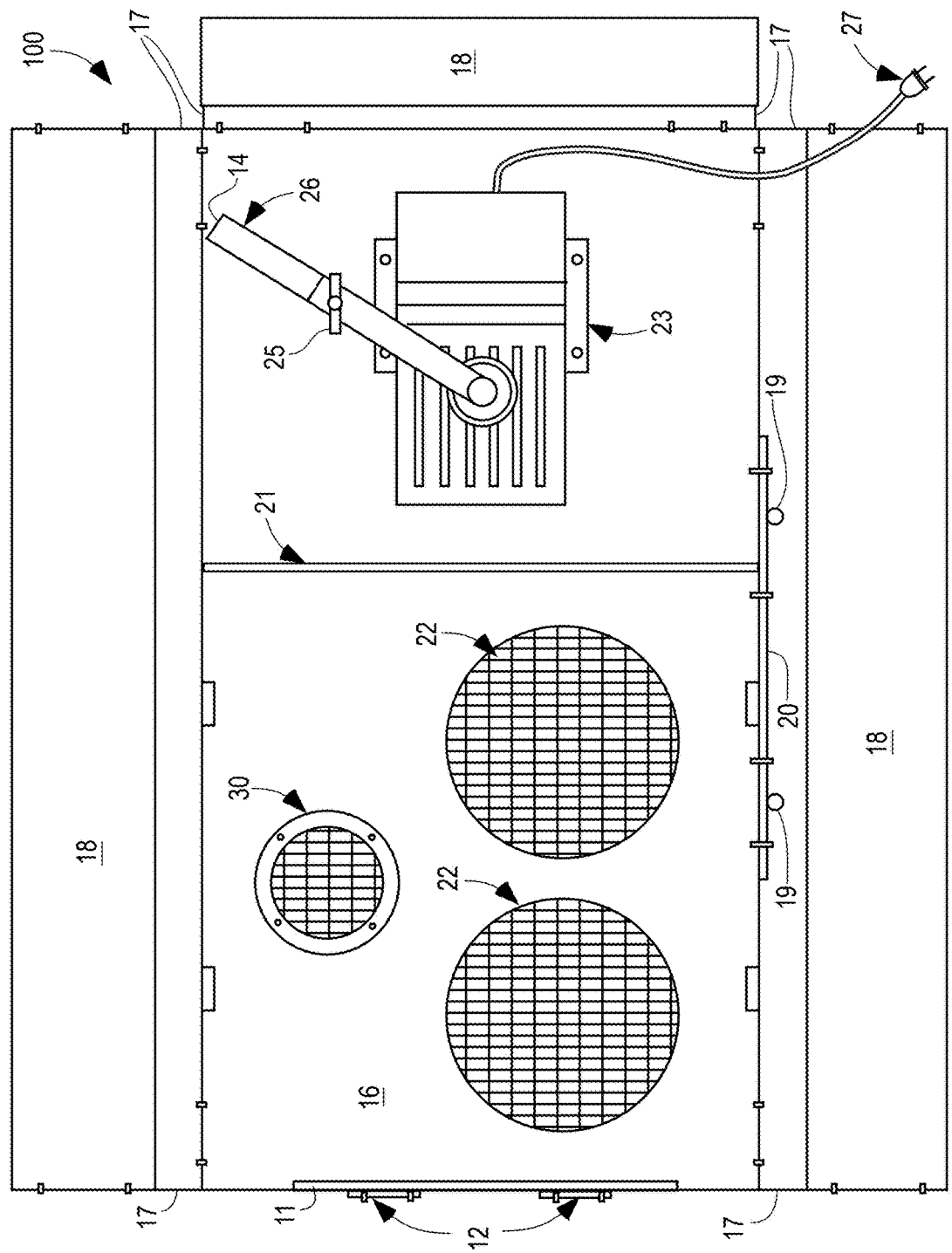
FIG. 3 is a schematic of an embodiment of the invention, showing a top-down view of an exemplary device.

FIG. 3 shows a top view of the embodiment shown in FIG. 1 and FIG. 2. The rear of the device shown in FIG. 1 is on the left in FIG. 3, and the right side of the device is shown at the bottom of the figure. FIG. 3 shows the floats 18 on the right, left and front sides of the housing 10 (e.g., 4 inch PVC float).

FIG. 3 shows the water inlet (e.g., through a weir door inlet 11) on the left side of the figure, and the filtration components in this embodiment that comprises two standard seven inch strainer baskets 22 and a three inch screened water inlet 30, each attached to (e.g., sitting in) the basket support plate 16. The divider wall 21 is seen separating the first portion of the housing interior with the filtration components from the second portion of the housing interior that contains the pump 23 (e.g., a 5300 GPH 110 electric submersible pump with a 20 foot 110 volt cord 27) that is attached to the water outlet pipe 26 which emits water from outlet 14.

Utility of the foregoing and other embodiments will be apparent to a person of skill in the art. The device can be used to clean and maintain a swimming pool independent of a main pool pump and circulation system. Thus, if the main pool pump and circulation system has been winterized, shut down for the season, or otherwise is not working, a portable swimming pool skimmer as set forth herein can be used to clean and maintain the pool. The pool may then not need to be covered, which may be beneficial because such covers can have an unattractive appearance, and the cover can blow off, get dirty (e.g., collect trash, debris and algae), making start-up for the net season more difficult, and have other disadvantages.

The device 100 is portable and self-contained, easy to move and store when not in use, and it relies on only 110 volt electrical power. It is adaptable to any swimming pool configuration, shape and size and it can be used with inground and above-ground swimming pools as free floating or attached to the side or in one place with brackets or other hardware.

When the water outlet pipe 26 is selectively positioned, the device 100 can be held in place and the pool water circulated with its debris to the portable swimming pool skimmer housing 10, thus automatically skimming the pool without the need for manual labor or constant supervision (e.g., the user can walk away and check the filter baskets only every 12-24 hours or as needed depending on the debris load). The only manual tasks needed are to turn the device on and off (which can be done remotely in some embodiments) and to empty out the filter components when full.

In accordance with some aspects of the disclosed subject matter, for example, a skimmer system may generally comprise: a housing comprising: an inlet chamber having a surface water inlet; an outlet chamber having a return water outlet; and a divider separating the inlet chamber and the outlet chamber, the divider having a divider aperture selectively allowing fluid communication of water from the inlet chamber to the outlet chamber; wherein the inlet chamber comprises a filter medium interposed between the surface water inlet and the divider aperture; wherein the outlet chamber comprises a pump to communicate filtered water from the divider aperture to the return water outlet; and wherein the return water outlet is selectively positioned to discharge filtered water to create circulation of surface water on a body of water to be skimmed in which the housing is deployed; and a float attached to the housing and selectively located to position the housing to float on the body of water such that the surface water is communicated to the surface water inlet; wherein the skimmer system is portable and capable of operation independent of an external pump system.

Skimmer systems are disclosed wherein the surface water inlet is a one-way inlet that prevents skimmed material from exiting the inlet chamber. For example, a skimmer system wherein the one-way inlet comprises a weir door and a skimmer system wherein the one-way inlet comprises a check valve are disclosed.

In some implementations, the filter medium comprises a basket filter; systems are disclosed wherein the basket filter comprises a filter sock.

A skimmer system wherein the filter medium comprises a plurality of filters is also disclosed.

As also set forth below, a skimmer system further comprising a dispersion plate to distribute water from the surface water inlet across the plurality of filters may have utility; the same is also true for a skimmer system further comprising a pre-filter material supported by the dispersion plate to prevent coarse material from reaching the filters.

The following description also addresses a skimmer system wherein a position of the float relative to the housing is selectively adjustable.

The following description also addresses a skimmer system wherein operation of the pump is selectively controllable to vary a flow rate through the return water outlet.

The following description also addresses a skimmer system further comprising a valve disposed between an output of the pump and the return water outlet to vary a flow rate through the return water outlet.

A skimmer system is also disclosed wherein the divider comprises a transverse wall separating the inlet chamber and the outlet chamber and the divider aperture comprises a space between a bottom surface of the housing and a bottom of the transverse wall.

A skimmer system further comprising a float valve electrically connected to the pump and operative to deactivate the pump in the event that a level of water in the outlet chamber drops below a predetermined level is also disclosed.

A skimmer system further comprising a mounting assembly attached to the housing and operative rigidly to mount the housing to a fixed external structure is also disclosed.

In accordance with another aspect of the disclosed subject matter, a method of skimming surface water may generally comprise: providing a skimmer system, the skimmer system comprising: an inlet chamber having a surface water inlet; an outlet chamber having a return water outlet; and a divider separating the inlet chamber and the outlet chamber, the divider having a divider aperture selectively allowing fluid communication of water from the inlet chamber to the outlet chamber; selectively floating the skimmer system on a surface of a body of water to be skimmed such that surface water is communicated to the surface water inlet; creating hydrostatic head in the inlet chamber and the outlet chamber using a pump disposed in the outlet chamber; responsive to the hydrostatic head, communicating the surface water through a filter, interposed between the surface water inlet and the divider aperture, to create filtered water; responsive to the hydrostatic head, communicating the filtered water from the divider aperture to the return water outlet; and selectively positioning the return water outlet to discharge the filtered water to create circulation of the surface water.

Methods are disclosed further comprising providing a one-way inlet at the surface water inlet thereby preventing skimmed material from exiting the inlet chamber via the surface water inlet.

For example, in one method, the one-way inlet comprises a weir door; in another method, the one-way inlet comprises a check valve.

Methods are disclosed wherein the filter comprises a basket filter, and wherein the basket filter comprises a filter sock.

Methods are disclosed wherein the filter comprises a plurality of basket filters.

Method further comprising providing a dispersion plate between the surface water inlet and the plurality of filter baskets to distribute water from the surface water inlet across the plurality of filters are also disclosed.

Methods further comprising supporting pre-filter material on the dispersion plate to prevent coarse material from reaching the basket filters are also disclosed.

Methods wherein the selectively floating comprises selectively adjusting a position of a float relative to the skimmer system such that the surface water is in fluid communication with the surface water inlet are also disclosed.

Methods further comprising selectively controlling the hydrostatic head to vary a flow rate through the return water outlet are also disclosed.

Methods further comprising providing a valve disposed between an output of the pump and the return water outlet to vary a flow rate through the return water outlet are also disclosed.

Methods further comprising providing a float valve electrically connected to the pump and operative to deactivate the pump in the event that a level of water in the outlet chamber drops below a predetermined level are disclosed.

The present disclosure also addresses methods further comprising mounting the housing to a fixed external structure.

In accordance with other aspects of the disclosed subject matter, a skimmer system may comprise: a housing; an inlet to the housing; an inlet chamber in liquid communication with the inlet; a filter medium in the inlet chamber; an outlet chamber in liquid communication with the filter medium; a pump in the outlet chamber; and an outlet from the pump.

A skimmer system is disclosed wherein the inlet is a surface liquid inlet. A skimmer system is disclosed wherein the surface liquid inlet is a weir door.

A skimmer system is disclosed further comprising a divider between the inlet chamber and the outlet chamber. A skimmer system is disclosed further comprising a divider aperture between the inlet chamber and the outlet chamber. A skimmer system is disclosed wherein the divider aperture is configured to flow liquid from the inlet chamber to the outlet chamber.

A skimmer system is disclosed wherein the inlet chamber includes an upper inlet sub-chamber and a lower inlet sub-chamber.

A skimmer system is disclosed further comprising a support plate between the upper inlet sub-chamber and the lower inlet sub-chamber.

A skimmer system is disclosed wherein the filter medium is in the lower inlet sub-chamber.

A skimmer system is disclosed wherein the filter medium is at least one filter basket. A skimmer system is disclosed wherein an opening of the at least one filter basket is in the upper inlet sub-chamber.

A skimmer system is disclosed wherein the outlet is an outlet pipe. A skimmer system is disclosed further comprising a valve in the outlet pipe.

A skimmer system is disclosed further comprising a float attached to the housing. A skimmer system is disclosed wherein the float is at an operative position relative to the inlet. A skimmer system is disclosed wherein the float is at an inline position relative to the inlet. A skimmer system is disclosed wherein the float is at a waterline relative to the housing.

A skimmer system is disclosed further comprising a mounting assembly on the housing. A skimmer system is disclosed further comprising a bracket assembly engageable with the mounting assembly. In accordance with some implementations, a skimmer system is disclosed wherein: the mounting assembly is configured to move relative to the bracket assembly; and the bracket assembly is configured to attach to a stationary object.

Figure 4:
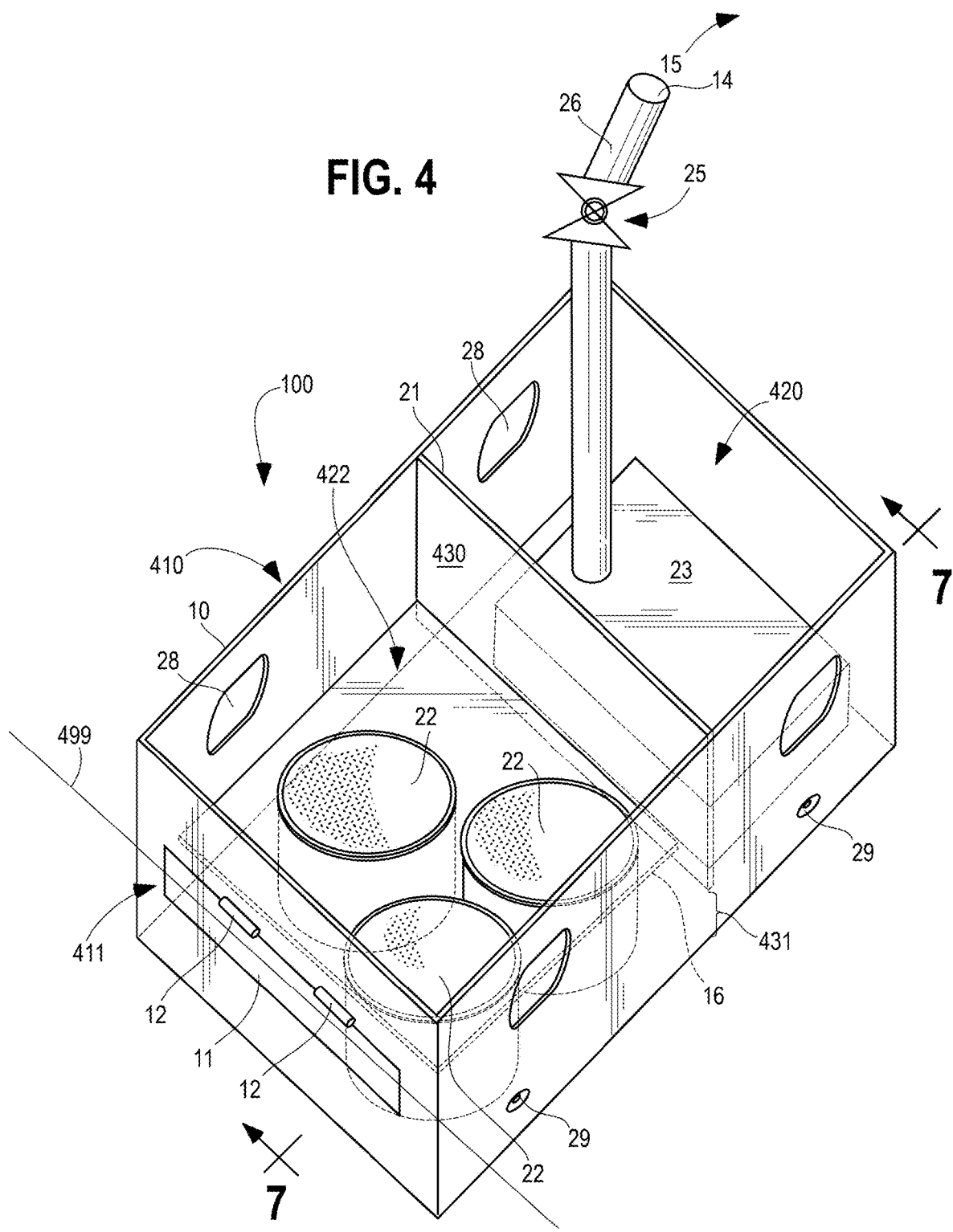
FIG. 4 is a perspective view illustrating some components of a swimming pool skimmer.
Figure 6:
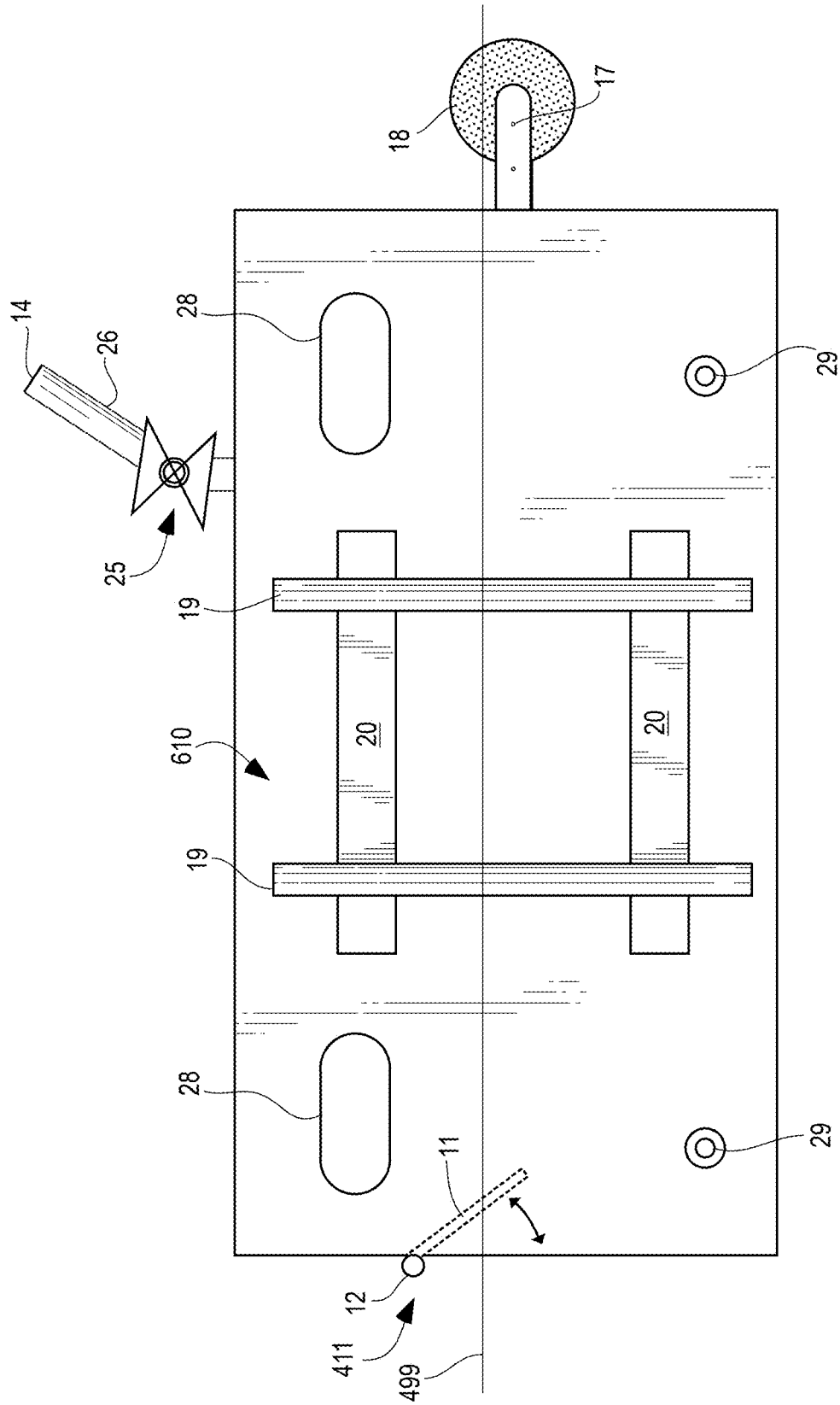
FIG. 6 is a right-side view of the swimming pool skimmer illustrated in FIG. 2.
Figure 7:
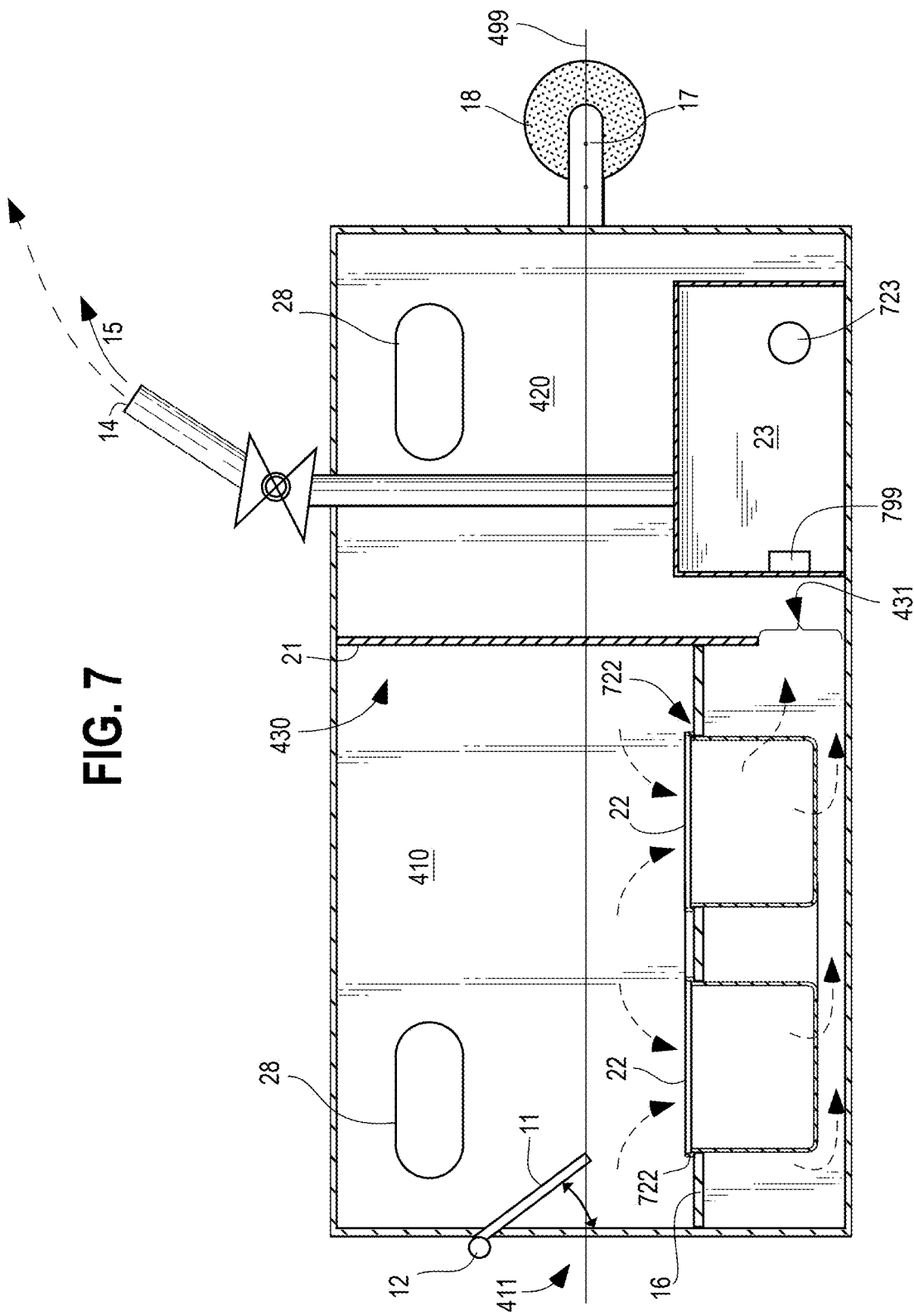
FIG. 7 is a right-side cross-sectional view of a swimming pool skimmer taken on the line 7-7 indicated in FIG. 4.

Returning to the drawing figures, FIG. 4 is a perspective view illustrating some components of a swimming pool skimmer, and FIG. 7 is a right-side cross-sectional view of a swimming pool skimmer taken on the line 7-7 indicated in FIG. 4. While many features of device 100 that are integral with or contained within housing 10 are illustrated as they may be arranged during use of one implementation, some features that were previously described with reference to FIGS. 1-3 have been omitted from FIGS. 4 and 7 for clarity. For example, power cord 27 and hardware for securing housing 10 to an external structure (such as attachment rails 20 and brackets 19, discussed in more detail below with reference to FIGS. 6 and 8) have been omitted from FIGS. 4 and 7 to illustrate other operative components of device 100 in more detail; also, floats 18 and brackets 17 have been omitted from FIG. 4 for the same reason. It will be appreciated, however, that floats 18 may be selectively secured to housing 10 to provide sufficient buoyancy to float housing 10 at a level such that a waterline 499 of a body of water is above a lower extremity of weir door inlet 11 as indicated in FIGS. 4 and 7.

Consistent with the implementations previously described, FIG. 4 illustrates a device 100 having both an inlet chamber 410 and an outlet chamber 420 that are partially separated by a divider 430 (such as divider wall 21).

In the implementation depicted in FIGS. 4 and 7, inlet chamber 410 has a surface water (or generally liquid) inlet 411 (embodied in or comprising weir door inlet 11, for example) that is appropriately dimensioned and positioned to admit surface water when housing 10 is supported via floats 18 at an appropriate level; specifically, water from a surface (such as at waterline 499) of a swimming pool or other body of water in which device 100 is deployed may be accepted or otherwise communicated via surface water inlet 411 (such as weir door inlet 11) into inlet chamber 410 powered by gravity.

In some implementations, it may be desirable that surface water inlet 411 comprises or operates in cooperation with a regulator, governor, or other mechanism (not shown) selectively to meter water flow into inlet chamber 410. For example, a sliding or pivoting panel may be deployed to limit or otherwise to control an area or dimensions of an opening for surface water inlet 411; additionally or alternatively, an opening at surface water inlet 411 (such as weir door inlet 11) may be spring-biased, valved, or otherwise selectively controllable to throttle a rate at which water is accepted through surface water inlet 411. This may be useful in situations in which it is desirable or necessary to balance the overall throughput of water through device 100 (i.e., the amount of water entering inlet chamber 410 via surface water inlet 411, per unit time, should match the amount of water discharged by pump 23 via outlet pipe 26), and may be a function of the clarity of the water to be skimmed, the size and nature of the material to be skimmed, the flow rate capabilities of pump 23, or a combination of these and a variety of other factors.

Inlet chamber 410 also comprises a filter medium (generally indicated at reference numeral 422) that is interposed between surface water inlet 411 and divider 430 (such as divider wall 21). Filter medium 422 may be embodied in or comprise filters 22, which may be in the form of meshed baskets (which may include or be used in conjunction with removable, replaceable, or reusable inserts), filter screens, nets, or porous fabrics, porous canisters containing sand, pebbles, or granules, or any other type of mechanical or chemical filtration devices and materials (such as carbon) that are generally known in the art. In some implementations, one of which was described above, it may be desirable to employ filters 22 of a basket variety or a screened water inlet 30, as these are readily available from retailers in standard sizes, though a combination of these and other filter devices may be employed as filter medium 422. The present disclosure is not intended to be limited by the number, dimensions, or specific material characteristics of filter medium 422, or whether it is embodied in or comprises baskets, canisters, removable nets or socks, and the like.

In use, filter medium 422 may be interposed between surface water inlet 411 and divider 430 such that there is no path for water to communicate from inlet chamber 410 to outlet chamber 420 without first passing through filter medium 422. In the implementation depicted in FIGS. 4 and 7 (as well as FIGS. 2 and 3), this is accomplished by seating, positioning, or otherwise supporting filter baskets 22 in a support plate 16. The support plate 16 may extend to all four walls of the inlet chamber 410 (i.e., the divider 430 wall and three walls of the housing 10), thereby keeping all inflowing water above the support plate 16, except for water flowing down into the filter medium 422 or filter baskets 22. The support plate 16 may thus divide the inlet chamber 410 into first (e.g., upper) and second (e.g., lower) inlet subchambers. The support plate 16 may include apertures, cutouts, or holes that are dimensioned for this purpose, and filter baskets 22 may include shoulders or rims to prevent filter baskets from falling through support plate 16 entirely, as is generally known in the art. This is best illustrated in FIG. 7, where filter baskets 22 are depicted having rims (reference numeral 722) that are slightly larger than the holes in support plate 16 that accommodate filter baskets 22. Such rims 722 or other structures on filter baskets 22 or other filter medium 422 may include o-rings, gaskets, or other mechanical sealing components to prevent water leaking between the structure of filter baskets 22 and support plate 16.

In some implementations, inlet chamber 410 may also include a dispersion plate (not illustrated in the drawings for clarity) disposed between surface water intake 411 and support plate 16 and generally comprising a plurality of holes, perforations, or apertures distributed across the plate. Structurally, such a dispersion plate may be placed just below surface water intake 411 and span the entire area of inlet chamber 410, such that water may not reach filter medium 422 without passing through the apertures of the dispersion plate. Functionally, such a dispersion plate may distribute water from surface water inlet 411 substantially uniformly across the plurality of filter baskets 22 illustrated in FIGS. 4 and 7. Additionally, the dispersion plate may serve the function of a coarse pre-filter, filtering large debris before it is allowed to encounter filter medium 422, and where such large debris is easier to reach by a user servicing device 100. Additionally or alternatively, the dispersion plate may support dedicated pre-filter material, such as steel wool or coarse screens, which may be easier to clean of large debris than filter medium 422.

Divider 430 may be embodied in or comprise divider wall 21 (such as described above with reference to FIGS. 1-3), and may include a divider aperture (reference numeral 431). In use, divider aperture 431 serves selectively to allow fluid communication of water from inlet chamber 410 (e.g., lower inlet sub-chamber) to outlet chamber 420, but only in the event that such water passes through filter medium 422. As best illustrated in FIG. 7 in which water flow through inlet chamber 410 is depicted by the dashed arrows, water may pass from inlet chamber 410 (e.g., lower inlet sub-chamber) to outlet chamber 420 via divider aperture 431, but is prevented by support plate 16 from reaching divider aperture 431 except by passing through filter medium 422 (in this case, filter baskets 22). While divider aperture 431 is depicted as a break in divider wall 21 (i.e., divider wall 21 may not extend to the bottom surface of housing 10), other options are contemplated. As noted above, such other options may include one or more slots, holes, or perforations (including screens, nets, or meshed materials) that may accommodate fluid communication from inlet chamber 410 to outlet chamber 420. The present disclosure is not intended to be limited by the number or characteristics of divider aperture 431, with the understanding that it be so positioned and dimensioned such that water is only communicated to outlet chamber after having first passed through filter medium 422.

In one alternate implementation, a short, secondary wall (not illustrated) may be deployed downstream of divider wall 21 (i.e., to the right in FIG. 7) and extending from the bottom of housing 10 to a level that is above the lowest extremity of divider wall 21 (or otherwise above a lowest level of divider aperture 431). In this case, filtered water delivered from inlet chamber 410 must pass under divider wall 21, then over this secondary wall prior to reaching an intake port of pump 23 (a pump intake is depicted at reference numeral 799 in FIG. 7). In the event of a failure of filter medium 422 or of the seal between filter baskets 22 and support plate 16, for example, any large or heavy debris that leaks past filter medium 422 may be trapped by the secondary wall and settle, thus not being ingested by intake 799 at pump 23. This may prevent or minimize the possibility that pump 23 may clog or experience undue wear and tear, as well as limit the amount of debris that may be returned to the body of water to be skimmed.

As noted above, pump 23, which is configured and operative to communicate filtered water from divider aperture 431 to return water outlet 14 via outlet pipe 26, may be contained, accommodated, or affixed in outlet chamber 420. In that regard, outlet chamber 420 serves as a reservoir of filtered water and to isolate pump 23 such that debris that enters inlet chamber 410 does not reach intake 799 of pump 23.

In use, return water outlet 14 (via outlet pipe 26) may be selectively positioned to discharge filtered water to create circulation of surface water (see reference numeral 499). By directing discharge from outlet 14, and by controlling its flow rate (e.g., via valve 25), ordinary operation of device 10 may encourage or create a circulation which urges unfiltered surface water toward surface water inlet 411. Outlet pipe 26 may swivel or pivot, for example, via a fluid coupling to a vertical pipe extending from pump 23. As noted above, flexible tubing may also be used for this purpose, if brackets or detent mechanisms are employed to prevent outlet 14 from buffeting under pressure due to high flow rates from pump 23.

In that regard, pump 23 may be embodied in any of various commercially available submersible electric pumps. For typical residential swimming pool applications, pump 23 may have a flow rate of between about 2000 and about 8000 gallons per hour (GPH), with flow rates of between about 5200 and 5800 GPH being suitable for a range of popular residential swimming pool volumes and surface areas. It will be appreciated that pump 23 may be selected to have a flow rate as a function of the surface area to be skimmed, the typical surface debris load, the particular implementation of surface water inlet 411 and filter medium 422, or a combination of these and a variety of other factors.

As noted above, pump 23 may be rigidly or removably affixed to housing 10 in outlet chamber 420 (such as via bolts, screws, or mounting brackets, for instance), though some commercially available pumps may be free standing, so attachment to housing 10 may not be necessary or desired, depending upon the specific implementation of pump 23 and the structural characteristics of and material used for housing 10, in general, and outlet chamber 420, in particular.

In some implementations, pump 23 may comprise, or may be electrically coupled to, an automatic shut-off switch 723. As is generally known in the art, shut-off switch 723 may monitor a level of water in outlet chamber 420 and automatically shut down or deactivate pump 23 in the event that such water level drops below a predetermined height above the bottom of outlet chamber 420. For example, in the event that the water level drops below the top of intake 799, pump 23 will, if left unattended, begin drawing air, in addition to water. Air bubbles and resulting cavitation may cause undue wear and tear, or even damage, to the impeller and other parts of pump 23, so it may be desirable or necessary to disable pump 23 before the water level in outlet chamber 420 drops further. Shut-off switch 723 may be embodied in any of various commercially available float switches, the operational characteristics and placement of which (if it is not integrated with pump 23 itself) may be selected as a function of the type, size, and operating parameters of the selected pump 23 and the location of intake 799.

Valve 25, as noted above, may be employed to provide fine control of discharge flow rate from pump 23. Valve 25 may be embodied in or comprise a ball valve, a gate valve, or any other type of hand-operated valve suitable for plumbing intended for swimming pool or outdoor landscaping water feature applications. In some implementations that may have particular utility in situations in which pump 23 does not have a variable output control, valve 25 may be remotely or electronically controlled, though a hand-operated version of valve 25 may have almost equivalent functionality at a relatively lower cost.

Figure 5:
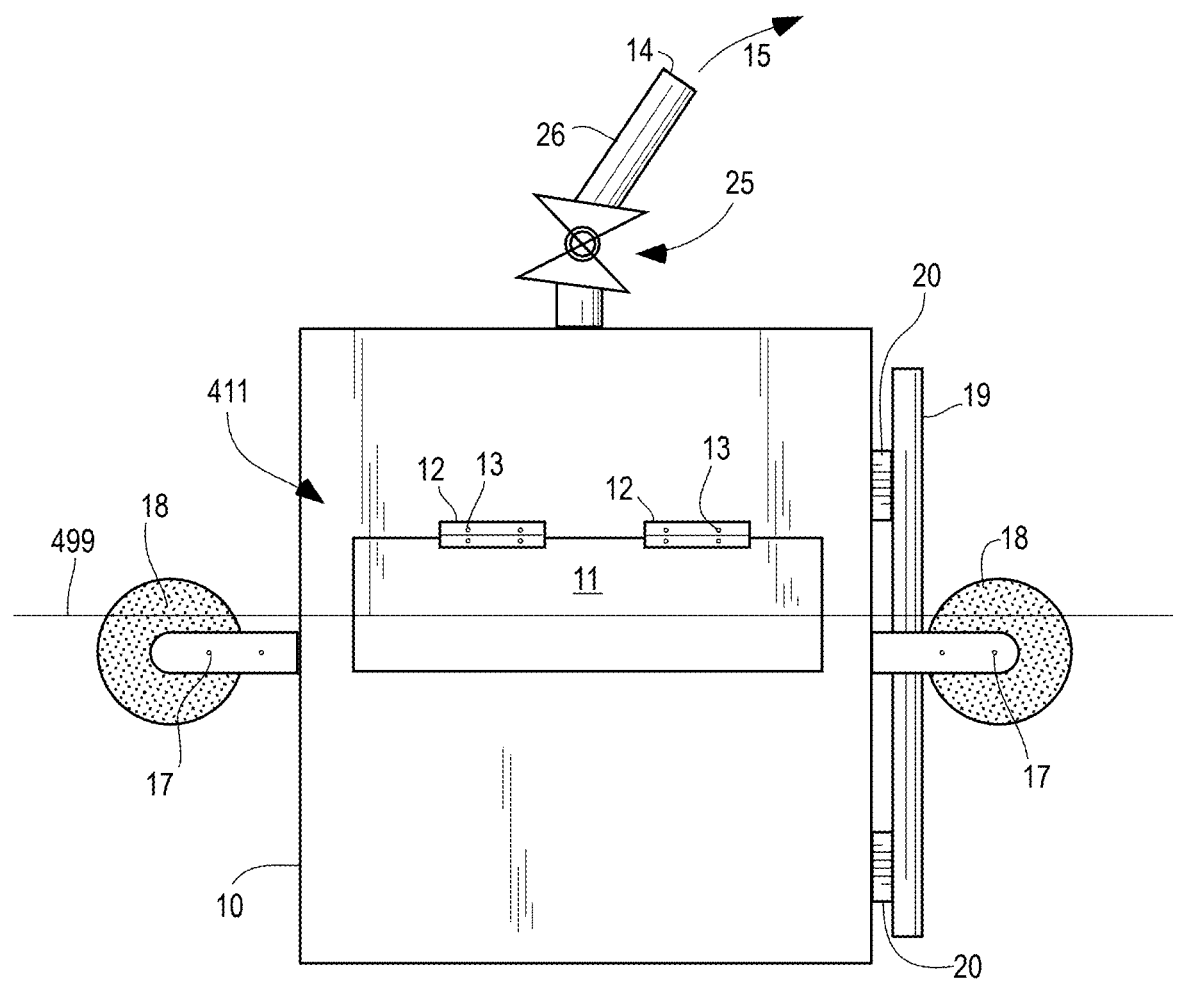
FIG. 5 is a rear view of the swimming pool skimmer illustrated in FIG. 1.

FIG. 5 is a rear view of the swimming pool skimmer illustrated in FIG. 1. In that regard, FIG. 5 is similar to FIG. 1, but functional components contained inside housing 10 are omitted from FIG. 5 for clarity. Of particular interest in FIG. 5 is the level of waterline 499, which is to be maintained by floats 18 above a lowest point of surface water inlet 411 (in this case, embodied by weir door inlet 11). In other words, the floats 18 may be at an operative position (such as at an inline position) relative to the surface water inlet 411. Further, the floats 18 may be at the waterline 499 which is relative to the housing 10.

The right side of FIG. 5 also clearly depicts bracket 19, which may be rigidly attached or affixed to housing 10 via attachment rails 20. In operation, bracket 19 may be slidably engaged with a bracket assembly that is fixed to an immovable external structure. As set forth in more detail below with reference to FIGS. 6 and 8, this slidable engagement allows housing 10, under influence of floats 18, to rise and sink as a function of the total volume of water contained within housing 10 at any given time and the amount of buoyancy provided by, and the location of, floats 18.

FIG. 6 is a right-side view of the swimming pool skimmer illustrated in FIG. 2. It will be appreciated that FIG. 6 is similar to FIG. 2, but functional components contained inside housing 10 are omitted from FIG. 6 for clarity. As with the illustration in FIG. 5, it is worth noting the level of the waterline 499 in FIG. 6 as it relates to a lowest point of surface water inlet 411.

As set forth above, employing weir door inlet 11 as surface water inlet 411 may have utility to the extent that weir door inlet 11 may remain open for so long as water is flowing through device 100, i.e., when pump 23 is discharging water from outlet chamber 420 via outlet pipe 26. When pump 23 is deactivated, water stops flowing through device 100, and weir door inlet 11 may then close (i.e., swing to the left as indicated by the arrows in FIG. 6). When weir door inlet 11 is closed (not shown in FIG. 6, debris may not return from inlet chamber 410 back into the pool or other body of water in which device 100 is deployed. In some applications, weir door inlet 11 may be weighted, spring-biased (such as at hinges 12), or both, to facilitate this functionality.

It will also be appreciated that the forgoing functionality may be replicated with other technologies incorporated into surface water inlet 411, depending upon the nature and operational characteristics of surface water inlet 411. For example, where surface water inlet 411 is embodied in or comprises a circular or rectangular fluid conduit fitting (not shown in FIG. 6), such a fitting may be provided with a one-way valve (or "check valve") to prevent backflow from inlet chamber 410, i.e., to prevent skimmed material to exit inlet chamber 410 and return to the body of water to be skimmed.

FIG. 6 also depicts a mounting assembly 610 which is configured and operative to mount housing 10 to a fixed external structure (not shown in FIG. 6) in a slidable relationship. Such an external structure may be a swim ladder, hand rail, diving board or slide support, life-guard stand, or other substantially immovable pool-side structure (for swimming pool applications) or a pier, piling, buoy, landscaping feature, rock outcropping, or tree or other vegetation (for pond or lake applications).

In the illustrated arrangement, mounting assembly 610 generally comprises brackets 19 which may be fixedly attached to housing 10 at attachment rails 20. Attachment rails 20 may be attached to housing 10 via adhesives, threaded fasteners, welding, or the like, depending upon the materials used for both housing 10 and attachment rails 20. For example, where housing 10 is constructed of acrylic, PVC, or plastic, attachment rails 20 may be of similar material and attached to housing via adhesives or PVC cement; screws, bolts, or press-fit or friction-fit clamps or clips may also be used. In the case of stainless steel or aluminum connections, metallic fastening elements such as bolts may be used, and even welding may be appropriate in some circumstances. The present disclosure is not intended to be limited by the types of materials used, or the fastening technology employed, in connection with housing 10 and mounting assembly 610.

In operation, mounting assembly 610 allows vertical movement of housing 10 relative to the fixed structure with which it is engaged as set forth in more detail with reference to FIG. 8, and any arrangement of structural components that facilitate this functionality may be employed as a design choice.

Figure 8:
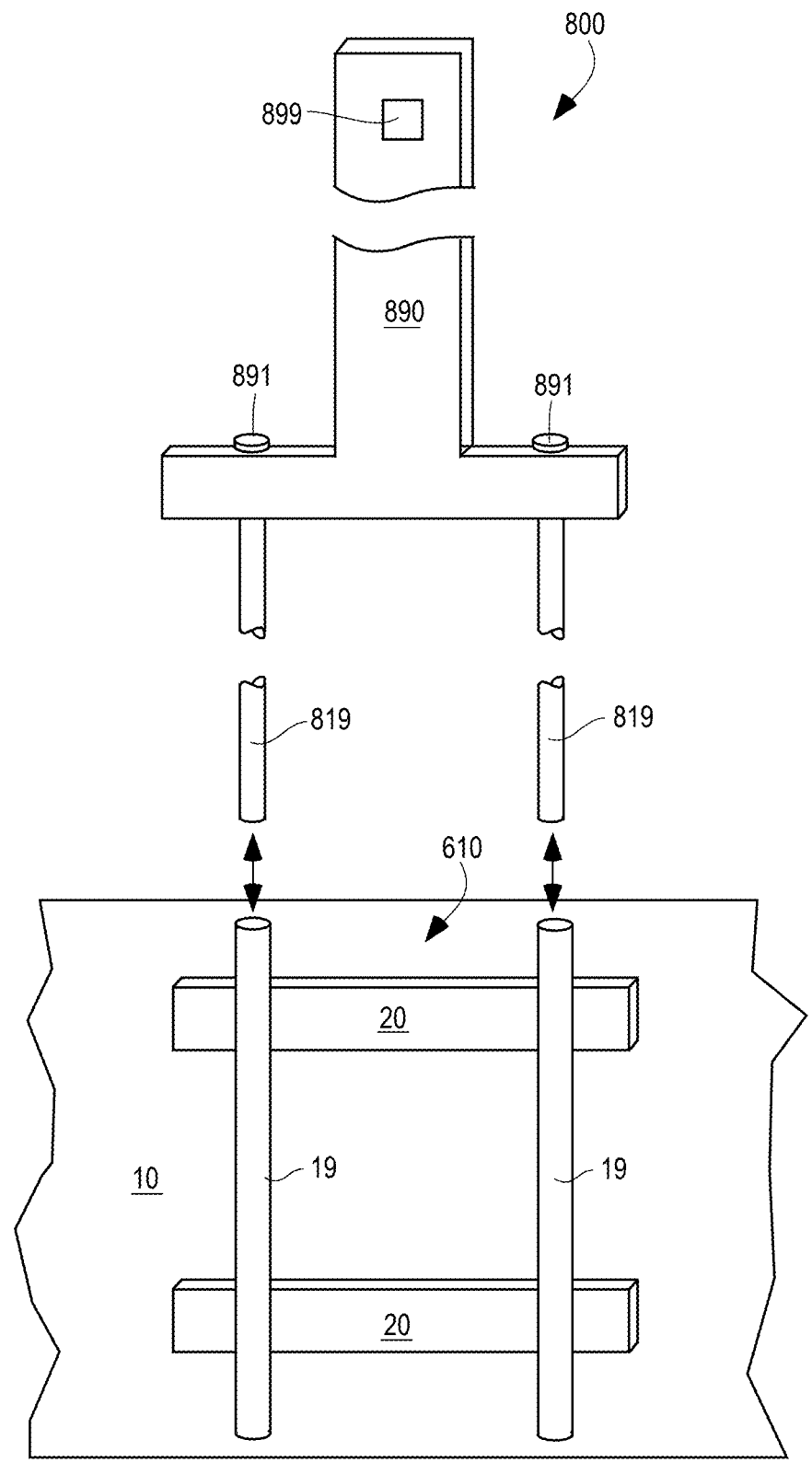
FIG. 8 is a partially exploded view of a bracket assembly for securing a swimming pool skimmer to a structure.

FIG. 8 is a partially exploded view of a bracket assembly for securing a swimming pool skimmer to a structure. It is noted that the mounting assembly 610 described above, comprising brackets 19 affixed to attachment rails 20 are shown attached to a portion of housing 10 near the bottom of FIG. 8 (the entirety of housing 10 is not included, for clarity). These components of mounting assembly 610 are so positioned and dimensioned as to engage and cooperate with bracket assembly 800 to enable movement relative to one another.

In the arrangement depicted in FIG. 8, bracket assembly 800 generally comprises a main bracket body 890 having a structural attachment component (depicted diagrammatically at reference numeral 899) and elongate projections 819, which may be affixed to main bracket body 890 via fasteners 891. Both main bracket body 890 and projections 819 are illustrated as broken, indicating that their respective dimensions in the vertical direction may vary, and are application-dependent.

In use, main bracket body 890 may be attached, mechanically coupled, or otherwise connected to a fixed external structure via attachment component 899. As set forth above, such an external structure may be any suitable substantially immovable object such as a swim ladder, hand rail, diving board support, rock, tree, pier or wharf, structural piling, and the like. Accordingly, the precise implementation of attachment component 899 may vary as a function of the external structure to which bracket assembly 800 is intended to be attached, the location of the structure, the dimensions of main bracket body 890, or a combination of these and other factors. Examples of attachment component 899 include metal or plastic press-fit or friction-fit clips, belts or straps, cleats, clips or hooks to engage cooperating u-bolts, jump rings, t-bollards, and the like. Attachment component 899 may be a simple ring of metal or plastic through which a line or cable may be passed to affix main bracket body 890 to an arbitrary external structure, or it may be purpose built and movable about one or more axes to attach main bracket body 890 to a very specific diameter of pool ladder handle. The present disclosure is not intended to be limited to any particular implementation of attachment component 899 or its materials, dimensions, or functional characteristics, though it is noted that it should be operative to maintain main bracket body 890 in a desired orientation relative to both the vertical direction and the external structure to which it is attached.

Main bracket body 890 serves to support projections 819. In that regard, projections 819 may be integral with a structure of main bracket body 890, or they may be rigidly attached thereto, such as by screws, rivets, bolts, or welds, for example (generally represented by reference numeral 891 in FIG. 8). Projections 819 are configured, dimensioned, and operative to engage cooperatively with brackets 19 of mounting assembly 610. In the illustrated arrangement, brackets 19 are fashioned as cylinders having an internal diameter sufficient to accept projections 819, which are depicted as rods having a circular cross-section and a diameter that is small enough to permit projections 819 to translate freely inside brackets 19 (as indicated by the double arrows in the drawing figure). It will be appreciated that cooperating rails and slidable rectangular projections may also have similar utility.

Where main bracket body 890 is attached to a fixed external structure and projections 819 are operably engaged with brackets 19, housing 10 is free to float on a surface of the water to be skimmed while maintaining a certain degree of freedom in the vertical direction. Horizontal movement of housing 10 (i.e., translation across the water's surface) is prevented; similarly, since two brackets 19 engage different projections 819 that are spaced horizontally, yawing (i.e., rotation about a vertical axis) of housing 10 is also prevented. When thus affixed to bracket assembly 800, which is in turn affixed to a substantially immovable external structure, housing 10 will remain in a particular location, and in a particular orientation, for the duration of its use, until a user takes active steps to reposition it. This ensures that discharge from water outlet 14 will create a desired circulation to urge surface water toward surface water intake 411 as set forth above.

Additionally, as a level of water inside inlet chamber 410 and outlet chamber 420 fluctuates during use (e.g., affecting buoyancy of device 100), housing 10 will have freedom to move in the vertical direction so as to maintain surface water inlet 411 at an appropriate level relative to waterline 499.

Several features and aspects of a skimmer system and method have been illustrated and described in detail with reference to particular embodiments, arrangements, or implementations by way of example only, and not by way of limitation. Those of skill in the art will appreciate that alternative implementations and various modifications to the disclosed subject matter are within the scope and contemplation of the present disclosure. Therefore, it is intended that the present disclosure be considered as limited only by the scope of the appended claims.

What is claimed is:

1. A pool skimmer system comprising;
a housing;
an inlet to the housing;
an inlet chamber comprising:
  an upper inlet sub-chamber in liquid communication with the inlet, and
  a lower inlet sub-chamber positioned below and in fluid communication with the upper inlet sub chamber;
a filter medium in the inlet chamber separating the upper and lower inlet sub-chambers such that fluid communication between the upper and lower inlet sub-chambers occurs through the filter medium;
an outlet chamber beside the inlet chamber and in liquid communication with the lower inlet sub-chamber of the inlet chamber;
a pump in the outlet chamber;
an outlet from the pump, the outlet comprising a terminus positioned above the top of the housing; and
one or more floats attached to the housing such that the pool skimmer system remains floating at a suitable level to admit surface water to enter the upper inlet sub-chamber via the inlet.

2. The skimmer system of claim 1, wherein the inlet is a surface liquid inlet.

3. The skimmer system of claim 2, wherein the surface liquid inlet is a weir door.

4. The skimmer system of claim 1, further comprising a divider between the inlet chamber and the outlet chamber; the divider preventing direct fluid communication between the upper inlet sub-chamber and the outlet chamber.

5. The skimmer system of claim 4, further comprising a divider aperture within the divider, the divider aperture permitting fluid communication between the lower inlet sub-chamber and the outlet chamber.

6. The skimmer system of claim 1, further comprising a support plate between the upper inlet sub-chamber and the lower inlet sub-chamber.

7. The skimmer system of claim 1, wherein the filter medium is at least one filter basket.

8. The skimmer system of claim 1, wherein the outlet is an outlet pipe.

9. The skimmer system of claim 8, further comprising a valve in the outlet pipe.

10. The skimmer system of claim 1, further comprising: a mounting assembly on the housing.

11. The skimmer system of claim 10, further comprising: a bracket assembly engageable with the mounting assembly.

12. The skimmer system of claim 11, wherein:
the mounting assembly is configured to move relative to the bracket assembly; and
the bracket assembly is configured to attach to a stationary object.

13. The pool skimmer system of claim 1, wherein the outlet from the pump comprises one of an outlet pipe or tubing.

14. A pool skimmer system comprising;
a housing;
an inlet to the housing;
an inlet chamber comprising:
  an upper inlet sub-chamber in liquid communication with the inlet, and
  a lower inlet sub-chamber positioned below and in fluid communication with the upper inlet sub chamber;
a filter medium in the inlet chamber separating the upper and lower inlet sub-chambers such that fluid communication between the upper and lower inlet sub-chambers occurs through the filter medium;
an outlet chamber beside the inlet chamber and in liquid communication with the lower inlet sub-chamber of the inlet chamber;
a pump in the outlet chamber;
an outlet pipe from the pump, wherein the outlet pipe comprises a terminus positioned above the top of the housing,
a valve in the outlet pipe; and
one or more floats attached to the housing such that the pool skimmer system remains floating at a suitable level to admit surface water to enter the upper inlet sub-chamber via the inlet.

* * * * *